(12) United States Patent
Young et al.

(10) Patent No.: US 8,442,974 B2
(45) Date of Patent: May 14, 2013

(54) METHOD AND SYSTEM FOR RANKING WEB PAGES IN A SEARCH ENGINE BASED ON DIRECT EVIDENCE OF INTEREST TO END USERS

(75) Inventors: David L. Young, Boulder, CO (US); Ioannis Pavlidis, Boulder, CO (US); William Randall Watler, Evergreen, CO (US); Kimbal J. Musk, Boulder, CO (US); Peter J. Newcomb, Erie, CO (US); Robert Reich, Boulder, CO (US)

(73) Assignee: Wal-Mart Stores, Inc., Bentonville, AR (US)

( * ) Notice: Subject to any disclaimer, the term of this patent is extended or adjusted under 35 U.S.C. 154(b) by 511 days.

(21) Appl. No.: 12/491,104

(22) Filed: Jun. 24, 2009

(65) Prior Publication Data

US 2009/0327281 A1   Dec. 31, 2009

Related U.S. Application Data

(60) Provisional application No. 61/076,524, filed on Jun. 27, 2008.

(51) Int. Cl.
*G06F 17/30* (2006.01)
(52) U.S. Cl.
USPC .......................................... 707/723

(58) Field of Classification Search ................ None
See application file for complete search history.

(56) References Cited

U.S. PATENT DOCUMENTS

| | | | |
|---|---|---|---|
| 6,546,388 B1 * | 4/2003 | Edlund et al. ................. 1/1 |
| 2002/0103789 A1 * | 8/2002 | Turnbull et al. ............... 707/3 |
| 2003/0061451 A1 * | 3/2003 | Beyda ........................ 711/137 |
| 2006/0041549 A1 * | 2/2006 | Gundersen et al. ........... 707/5 |
| 2006/0230040 A1 * | 10/2006 | Curtis et al. ................ 707/7 |
| 2008/0059444 A1 * | 3/2008 | Singh et al. ................. 707/4 |
| 2009/0132517 A1 * | 5/2009 | Schneider .................... 707/5 |

* cited by examiner

*Primary Examiner* — Syed Hasan
*Assistant Examiner* — Haroon Hasan
(74) *Attorney, Agent, or Firm* — David R. Stevens; Stevens Law Group

(57) ABSTRACT

A method and system for ranking Web pages in a Web search engine is described. One illustrative embodiment receives a Web search query from a particular user, the query including at least one keyword; identifies one or more Web pages that contain the at least one keyword; determines, for each of the one or more Web pages, a raw page ranking; adjusts the raw page ranking of each of at least one Web page among the one or more Web pages based on direct evidence of how interesting that Web page is to users to produce an adjusted page ranking, the direct evidence being derived from clickstream data collected from the users; and presents, as search results, the at least one Web page to the particular user in accordance with the adjusted page rankings.

20 Claims, 5 Drawing Sheets

METHOD AND SYSTEM FOR RANKING WEB PAGES IN A SEARCH ENGINE BASED ON DIRECT EVIDENCE OF INTEREST TO END USERS

PRIORITY

The present application claims priority to commonly owned and assigned U.S. Provisional Patent Application No. 61/076,524, filed on Jun. 27, 2008, entitled "Method and System for Ranking Web Pages in a Search Engine Based on Direct Evidence of Interest to End Users," which is incorporated herein by reference in its entirety.

RELATED APPLICATIONS

The present application is related to the following commonly owned and assigned U.S. patent applications: U.S. application Ser. No. 11/556,655, U.S. Publ. No. 2007/0112719 A1, "System and Method for Dynamically Generating and Managing an Online Context-Driven Interactive Social Network," filed on Nov. 3, 2006; U.S. application Ser. No. 11/556,659, U.S. Publ. No. 2007/0192461 A1, "System and Method for Dynamically Generating and Managing an Online Context-Driven Interactive Social Network," filed on Nov. 3, 2006; and U.S. application Ser. No. 12/024,984, U.S. Publ. No. 2009/0055369 A1, "System, Method and Apparatus for Implementing Dynamic Community Formation Processes Within an Online Context-Driven Interactive Social Network," filed on Feb. 1, 2008; each of which is incorporated herein by reference in its entirety.

FIELD OF THE INVENTION

The present invention relates generally to World-Wide-Web ("Web") search engines. More specifically, but without limitation, the present invention relates to methods and systems for ranking the relevance of Web pages returned by a Web search engine in response to a search query.

BACKGROUND OF THE INVENTION

The current state of the art for a basic search engine is to index documents by keywords. When the user searches for those keywords, the documents containing them are found. The results are typically ranked by how frequently the keywords occur in each of the results. In some search engines, other criteria are considered in addition to keyword frequency.

One problem is that keyword frequency alone is not a great indicator of how interesting the document is. For example, if one types, "All work and no play makes Jack a dull boy" thousands of times and puts it on a Web page, it would rank high on a search for "play" or "Jack," but it would not be a very interesting result.

One well-known page rank algorithm is that used by the popular Web search engine Google. Google's page rank algorithm relies on information about how frequently a document is referenced (linked to) from other documents. The rationale is that a document that is "linked to" by lots of other documents must be interesting, so its rank is increased as the number of such external references increases.

A disadvantage of Google's solution is that it uses derivative evidence to determine how interesting a document is. That is, it is not evidence that the person doing the search will find the document interesting. Rather, it is evidence only that a content author or a Web master (i.e. the person who creates the link, not the person who traverses the link) found the document interesting.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for ranking Web pages in a Web search engine. One illustrative embodiment is a method for ranking Web pages in a Web search engine, comprising receiving, over a network at the computer server, a Web search query from a particular user, the Web search query including at least one keyword, the computer server hosting the Web search engine; identifying one or more Web pages that contain the at least one keyword; determining, for each of the one or more Web pages, a raw page ranking; adjusting the raw page ranking of each of at least one Web page among the one or more Web pages based on direct evidence of how interesting that Web page is to users to produce an adjusted page ranking, the direct evidence being derived from clickstream data collected from the users; and presenting, as search results, the at least one Web page to the particular user in accordance with the adjusted page rankings.

Another illustrative embodiment is a system for ranking Web pages in a Web search engine, comprising at least one processor; a communication interface; and a memory containing a plurality of program instructions configured to cause the at least one processor to receive, via the communication interface over a network, a Web search query from a particular user, the Web search query including at least one keyword; identify one or more Web pages that contain the at least one keyword; determine, for each of the one or more Web pages, a raw page ranking; adjust the raw page ranking of each of at least one Web page among the one or more Web pages based on direct evidence of how interesting that Web page is to users to produce an adjusted page ranking, the direct evidence being derived from clickstream data collected from the users; and present, as search results, the at least one Web page to the particular user in accordance with the adjusted page rankings.

These and other embodiments are described in further detail herein.

BRIEF DESCRIPTION OF THE DRAWINGS

Various objects and advantages and a more complete understanding of the present invention are apparent and more readily appreciated by reference to the following Detailed Description when taken in conjunction with the accompanying drawings, wherein.

DETAILED DESCRIPTION

How "interesting" a search result (Web page) is to a user is, of course, subjective. Therefore, this problem is best solved by using some evidence of how likely real people are to find the result interesting and to combine that with keyword scoring or other criteria.

Figure 1:
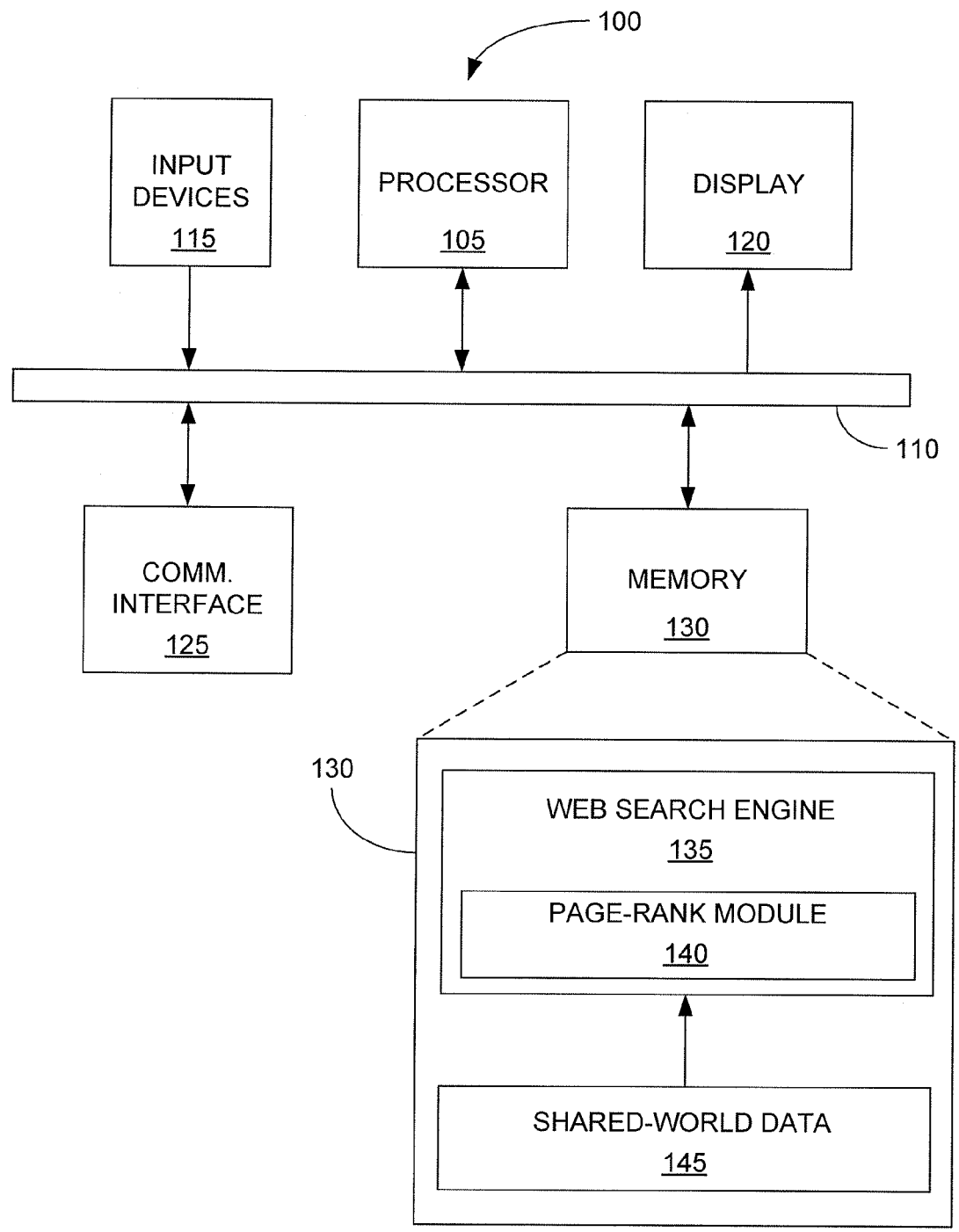
FIG. 1 is a functional block diagram of a Web server equipped with a Web search engine in accordance with an illustrative embodiment of the invention.

Referring now to the drawings, where like or similar elements are designated with identical reference numerals throughout the several views, and referring in particular to FIG. 1, it is a functional block diagram of a Web server 100 equipped with a Web search engine ("search engine") 135, in accordance with an illustrative embodiment of the invention. Web server 100 may be any computing device capable of hosting search engine 135 for access by one or more client computers (not shown in FIG. 1) over a network such as the Internet. In some embodiments, portions of search engine 135 are distributed across multiple servers.

In FIG. 1, processor 105 communicates over system bus 110 with input devices 115, display 120, communication interface 125, and memory 130. Though FIG. 1 shows only a single processor, multiple processors or a multi-core processor may be present in some embodiments. Display 120 is optional and is not necessarily present in every embodiment.

Input devices 115 include, for example, a keyboard, a mouse or other pointing device, or other devices that are used to input data or commands to Web server 100 to control its operation. Such input devices 115 are optional components of Web server 100 and may not be present in every embodiment.

In the illustrative embodiment shown in FIG. 1, communication interface 125 is a Network Interface Card (NIC) that implements a standard such as IEEE 802.3 (often referred to as "Ethernet") or IEEE 802.11 (a set of wireless standards). In general, communication interface 125 permits Web server 100 to communicate with one or more client computers via the Internet. In communicating with other computers via a network, Web server 100 may employ protocols such as the Internet protocol suite (TCP/IP), Hypertext Transfer Protocol (HTTP), instant-messaging protocols, or other protocols.

Memory 130 may include, without limitation, random access memory (RAM), read-only memory (ROM), flash memory, magnetic storage (e.g., one or more hard disk drives), optical storage, or a combination of these, depending on the particular embodiment.

In one illustrative embodiment, search engine 135 is a software application residing in memory 130 that is executed by processor 105. In general, the functionality of search engine 135 can be implemented in software, firmware, hardware, or any combination or sub-combination thereof. Search engine 135 may be divided into various functional modules. How such functional divisions are defined is arbitrary. One such functional module, page-rank module 140, is shown in FIG. 1. Page-rank module 140 assigns relative importance ("interestingness") rankings to the pages that are returned as results when a user submits a search query to search engine 135. In doing so, page-rank module 140 makes use of Shared-World data 145. Shared-World data 145 and the functionality of page-rank module 140 will next be described.

The page-rank approach described herein uses data from what will be referred to herein as the "Shared World" to determine which pages are most interesting. The Shared World is a model of how content on the Internet is actually used and how pages of that content are related to one another. The Shared World may also contain other knowledge about content usage such as how pages are related to a user's "task" (e.g., what he or she is trying to accomplish by using the Internet, such as purchasing an iPhone). The Shared World is built from actual attention data (clickstreams) collected from the sensors in particular applications that have been distributed (as of this writing) to hundreds of thousands of Internet users in all parts of the (real) world. One example of such an application is a social-networking and collaborative-Web-browsing application from Me.dium, Inc. (now OneRiot) that enables users at different computers, in real time, to browse Web pages together. In other embodiments, the clickstream data can include data collected from users through Application Service Providers (ASPs) such as MYSPACE, FACEBOOK, TWITTER, etc.

The Shared World can be implemented as a graph (in the formal computer science sense) in which each location (URL) visited is represented as a node. The connections represent locations that users have visited before and/or after the current location. These connections contain a correlation coefficient that indicates "how related" the two locations are. If a lot of people traverse from location A to location B, the correlation will become very strong. Conversely, when people stop traversing from A to B, the coefficient decays over time until the coefficient eventually becomes zero (the pages are no longer "connected"). In one embodiment, metadata is maintained concerning how many people visit each node and how often. This includes the most common visitors, their average duration at the location, the mean time between visits, the average number of expected visitors at any given moment, and so forth. In some embodiments, the Shared-World data is spread among multiple machines to support very large data collections.

The data and metadata in the Shared World are continually being enhanced in order to support new applications (such as search engine 135) that are built on top of the Shared World. Additional details about the creation and management of such a Shared World can be found in the following commonly owned U.S. patent applications included herewith as Appendices A, B, and C, each of which is incorporated herein by reference in its entirety: U.S. application Ser. No. 11/556,655, U.S. Publ. No. 2007/0112719 A1, "System and Method for Dynamically Generating and Managing an Online Context-Driven Interactive Social Network," filed on Nov. 3, 2006; U.S. application Ser. No. 11/556,659, U.S. Publ. No. 2007/0192461 A1, "System and Method for Dynamically Generating and Managing an Online Context-Driven Interactive Social Network," filed on Nov. 3, 2006; U.S. application Ser. No. 12/024,984, "System, Method and Apparatus for Implementing Dynamic Community Formation Processes Within an Online Context-Driven Interactive Social Network," filed on Feb. 1, 2008.

Using data from the Shared World in a page-ranking algorithm (e.g., page-rank module 140) is an improvement over previous approaches in that it is direct (first-order, non-derivative) evidence from end users (the same people doing the searches). Though the term "page rank" is sometimes used in industry to refer to GOOGLE's specific Web-page-ranking algorithm, in this Detailed Description, the terms "page-rank module," "page ranking," and "raw page ranking" refer to techniques employed in various illustrative embodiments of the invention, not to the well-known GOOGLE page rank algorithm.

There is a lot of data from the Shared World that can be used to adjust a raw page ranking. Such a raw page ranking is based, for example, on simple keyword frequency in some embodiments. In other embodiments, additional criteria such as synonyms, misspellings, proximity of the search terms to one another, and the order in which search terms appear in a document can also influence the raw page ranking. In one illustrative embodiment, two types of data are used to gauge how interesting a particular Web page is. In other embodiments, other Shared-World data may be used.

The first type of data is a measure referred to herein as "connectedness." This is somewhat analogous to Google's approach of determining how "referenced" a page is. It differs from the Google approach, however, in that it is based on how often actual Web surfers traverse to or from the target Web page (i.e., how "connected" the page is to other pages on the Internet). Thus, this measure goes beyond the concept of the page being linked from other locations: It is about whether or not people actually visit that page via those links.

Connectedness can be quantified in a variety of ways, depending on the particular embodiment. In one illustrative embodiment, the number of connections (user traversals) to a given target URL from a another node (URL) of the Shared-World graph is scaled by some factor (e.g., 0.01), and the resulting product is added to the raw page ranking to produce an adjusted page ranking. In some embodiments, the number of such connections tracked for a given target URL may have an upper limit (e.g., 32).

In other embodiments, the correlation coefficient associated with a particular edge in the graph (see Appendices A, B, and C) is included in the computation of connectedness. Such an embodiment takes into account factors such as the amount of time a user spends at the target URL after leaving the previous URL. In one embodiment, the correlation coefficient associated with each edge is a nonlinear quantity that is strengthened by additional user traversals from the preceding URL to the target URL. The correlation coefficient decays over time in the absence of additional traversals, at first slowly and then more abruptly. Eventually, if there are no further user traversals between the applicable URLs, the correlation coefficient drops to zero.

The second type of data is a measure referred to herein as "velocity." In one illustrative embodiment, velocity is computed as a ratio of how many people were recently visiting the page to the number that would be expected historically. If more people are visiting a page than what is "normal" (for that page), the page is considered to have a positive velocity. If fewer people are visiting than normal (for that page), the page is considered to have a negative velocity. If approximately the expected number of users is visiting the page, the velocity is considered to be neutral. With this measure, a negative velocity may actually decrease the page's rank; it may have a lot of keywords that match, but actual people are losing interest in the page right now.

In one illustrative embodiment, the velocity of a given Web page is computed as (CV−EV)/EV, where CV is the number of current visitors to the page within the past hour and EV is the (non-zero) expected (average) number of visitors to the page per hour, based on historical data. Thus, a velocity of zero is neutral. When CV is greater than EV, the velocity is positive. When CV is less than EV, the velocity is negative. In this embodiment, velocity may be represented in decimal form or as a percentage. For example, when half as many users visit a page as expected, the velocity is −0.5 or −50%; when twice as many users visit a page as expected, the velocity is 1.0 or 100%.

Measures such as the above can be used to adjust an estimate of how interesting a page is (its ranking) based on the usage patterns of real people, and such ranking adjustments can be made in real time. This gives the ranking method described here a significant advantage in that it can react quickly to the fluid nature of content on the Internet. The above concepts are illustrated in the following two examples.

Example No. 1: The Denver Broncos win the Super Bowl. Fans flock to all of the news stories to relive the minutiae of the game. Those pages start with a handful of visitors and the number continues to increase. This results in a large positive velocity for those sites. Even though the news stories may not mention the words "Denver Broncos" more often than old content (say, the team's home page), those pages would still rank higher in the search results due to their strongly positive velocity score.

Example No. 2: General searches with just a few terms (e.g. "Java," "voodoo," "garden snake") differ from specific searches (e.g. "Denver Broncos Super Bowl XXXIII") in that the user is just looking for basic information about a topic such as is best found in sources such as Wikipedia. But the Wikipedia article may not have any more occurrences of the terms than most other content. However, since Wikipedia articles don't tend to be part of any "task" (i.e., users tend to just "jump" there from something else they are working on), the connectedness of the Wikipedia entry will be very high, allowing page-rank module 140 to easily sort that entry toward the top of the search results.

In one illustrative embodiment, the keyword-frequency-based search index score returned by page-rank module 140 for a given page is normalized to lie within [0,1]. One tenth (0.1) of the page's velocity score (−0.05 or +0.1, from the examples above) and one one hundredth (0.01) of the page's connectedness score (e.g., the number of connections or user traversals from a preceding URL to the target URL in the Shared-World graph) are added to the raw page ranking to obtain the adjusted page ranking for that page.

There are endless variants on the specific approach to building a Shared World and how to use the knowledge and data from the Shared World as evidence to adjust the ranking of a given page. In some embodiments, the manner of building, managing, and using the Shared World may be different than that described above, for example.

Figure 2:
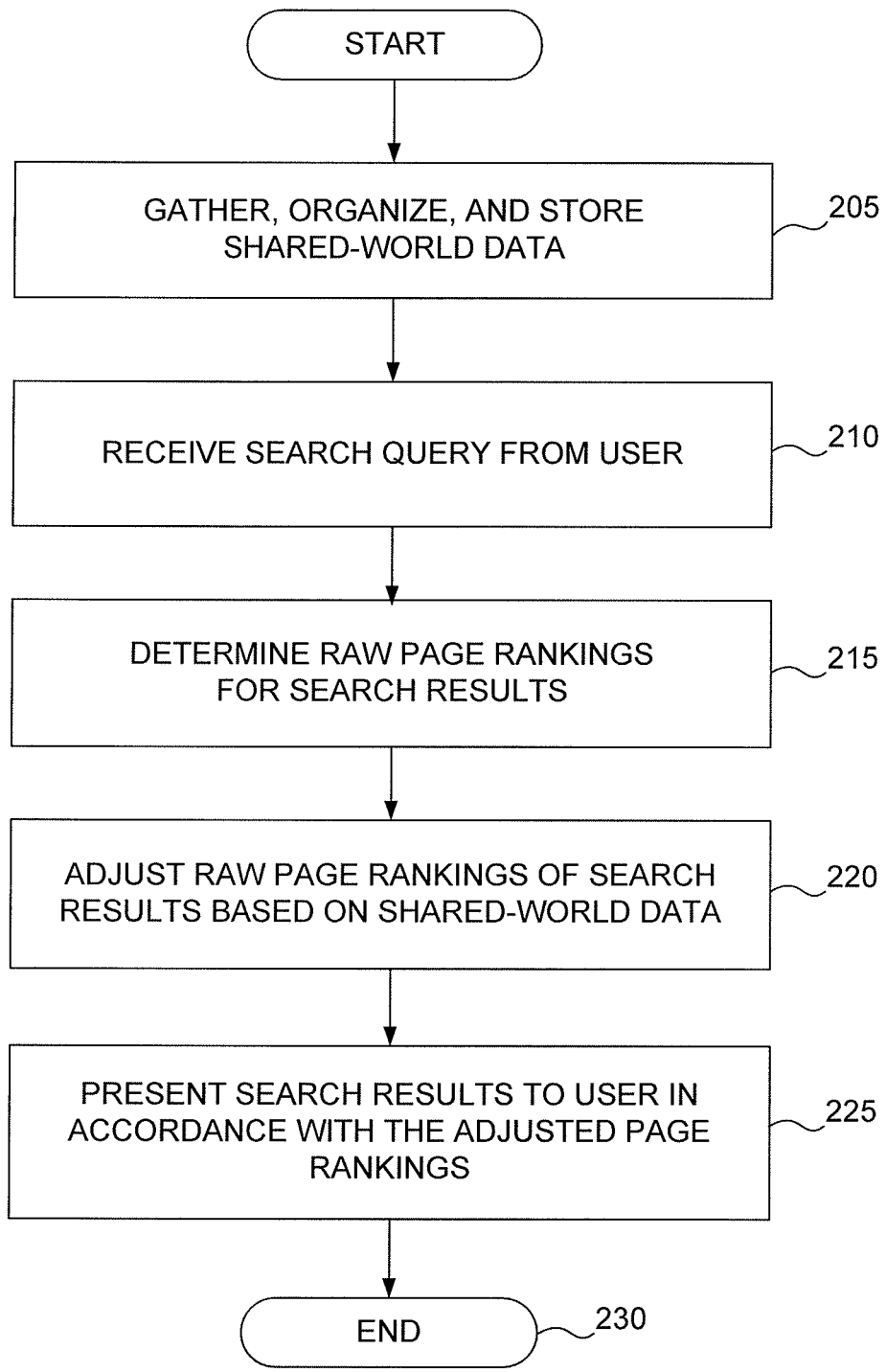
FIG. 2 is a flowchart of a method for ranking Web pages in a Web search engine in accordance with an illustrative embodiment of the invention.

FIG. 2 is a flowchart of a method for ranking Web pages in a Web search engine, in accordance with an illustrative embodiment of the invention. At 205, Shared-World data 145 is gathered, organized, and stored on Web server 100 as described above.

At 210, search engine 135 receives from a user's client computer a search query containing one or more keywords. At 215, page-rank module 140 determines, for each Web page returned as part of the search results, a raw page ranking.

At 220, page-rank module 140 adjusts the raw page rankings determined at 215 based on the Shared-World data 145 associated with the respective Web pages in the search results. For example, Shared-World-data measures such as connectedness and velocity, as described above, may be used to increase or decrease a given Web page's raw page ranking to better indicate how interesting that Web page might be to the user performing the Web search.

At 225, search engine 135 presents all or a portion of the search results to the user in accordance with the adjusted page rankings determined at 220. At 230, the process terminates.

Figure 4:
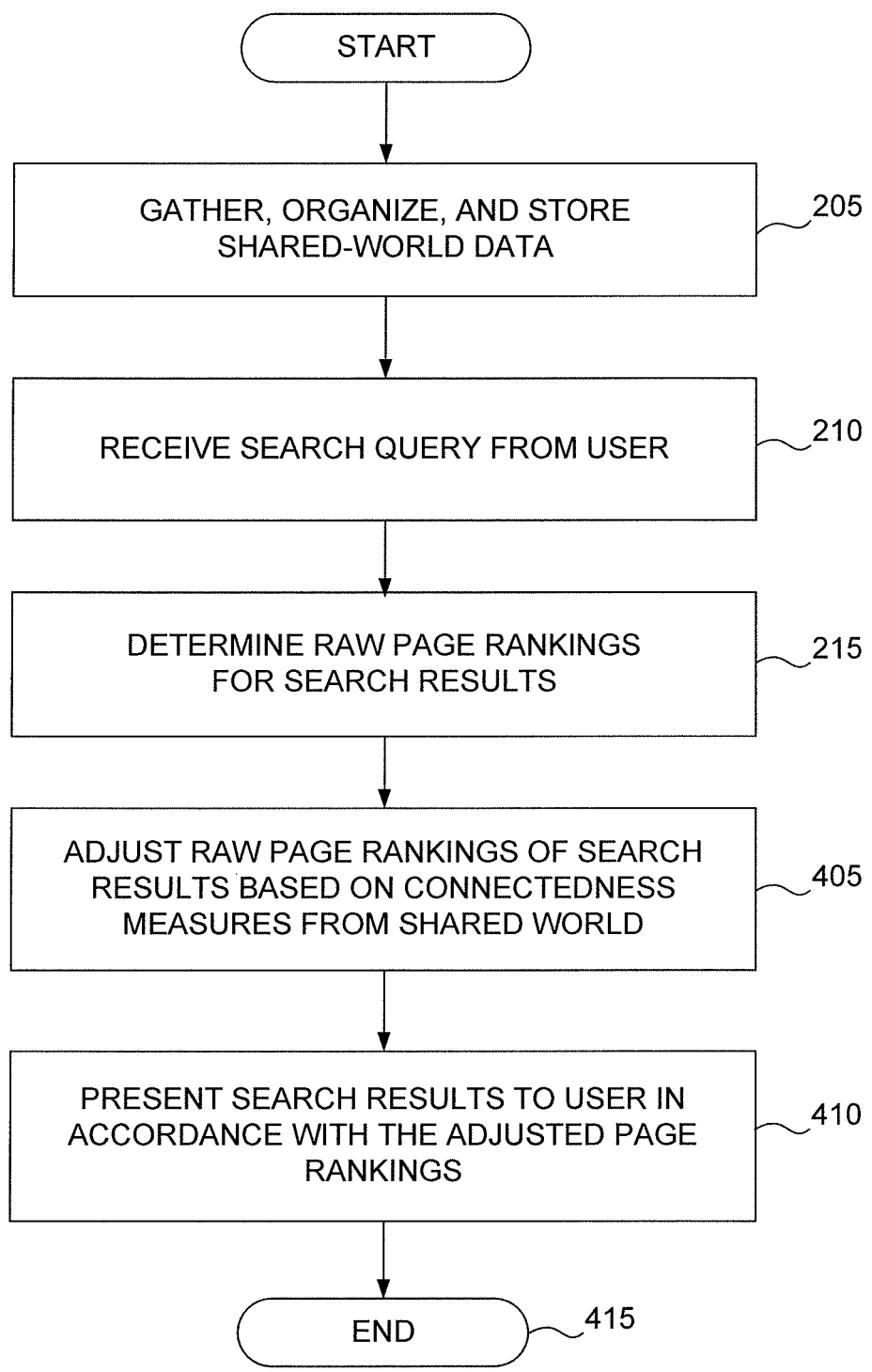
FIG. 4 is a flowchart of a method for ranking Web pages in a Web search engine in accordance with another illustrative embodiment of the invention.

Referring next to FIG. 4, it is a flowchart of a method for ranking Web pages in a Web search engine in accordance with another illustrative embodiment of the invention. The method shown in FIG. 4 proceeds as in FIG. 2 through Block 215. At 405, the raw page ranking of each Web page in the search results is adjusted by adding some fraction (e.g., 0.01) of the page's connectedness score (based on a count of the number of user traversals or connections from a preceding URL to the target URL) to the raw page ranking.

At 410, search engine 135 presents all or a portion of the search results to the user in accordance with the adjusted page rankings determined at 405. At 415, the process terminates.

Figure 5:
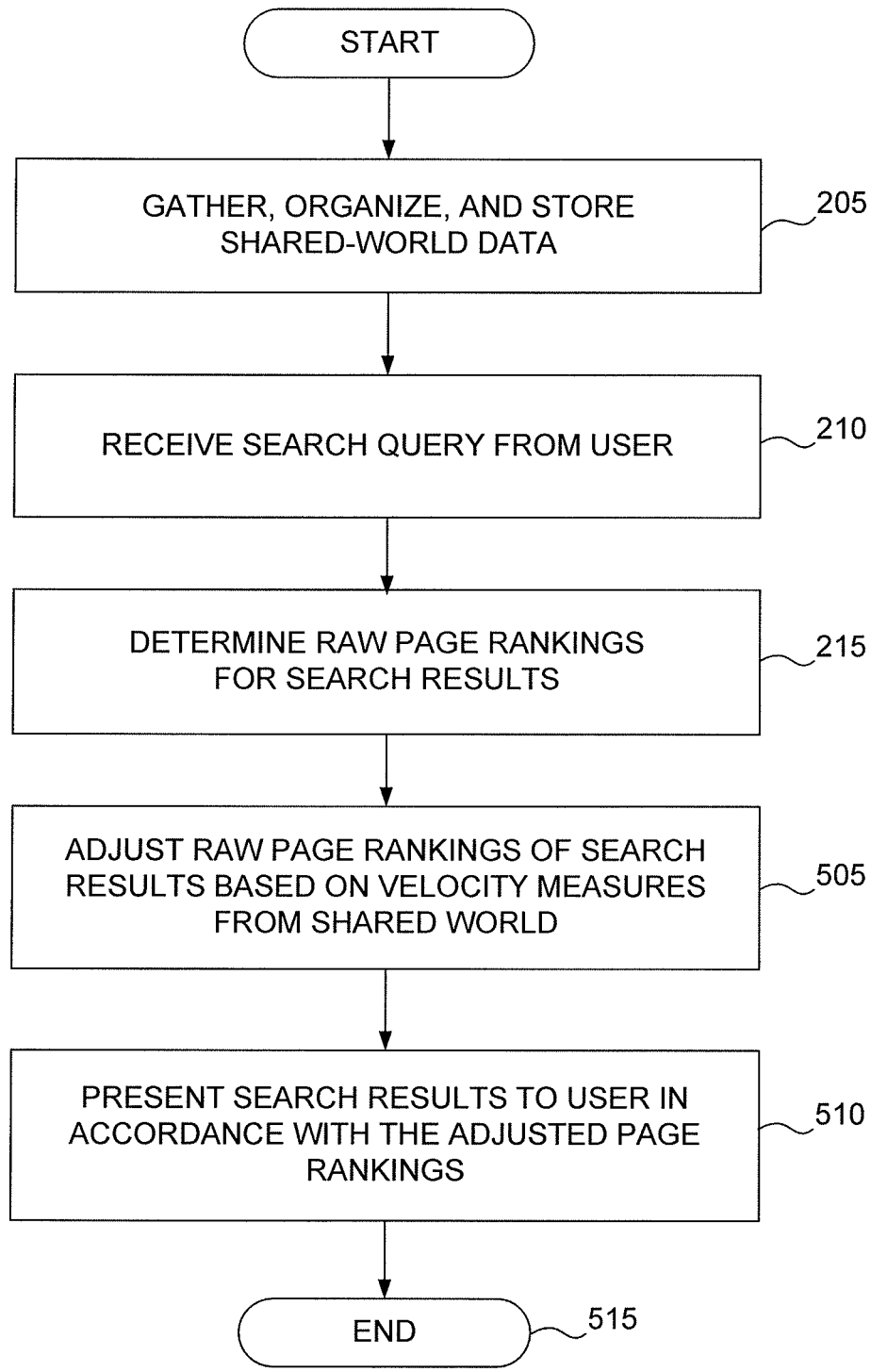
FIG. 5 is a flowchart of a method for ranking Web pages in a Web search engine in accordance with yet another illustrative embodiment of the invention.

Referring next to FIG. 5, it is a flowchart of a method for ranking Web pages in a Web search engine in accordance with another illustrative embodiment of the invention. The method shown in FIG. 5 also proceeds as in FIG. 2 through Block 215. At 505, the raw page ranking of each Web page in the search results is adjusted by adding some fraction (e.g., 0.1) of the page's velocity score to the raw page ranking.

At 510, search engine 135 presents all or a portion of the search results to the user in accordance with the adjusted page rankings determined at 505. At 515, the process terminates.

Figure 3:
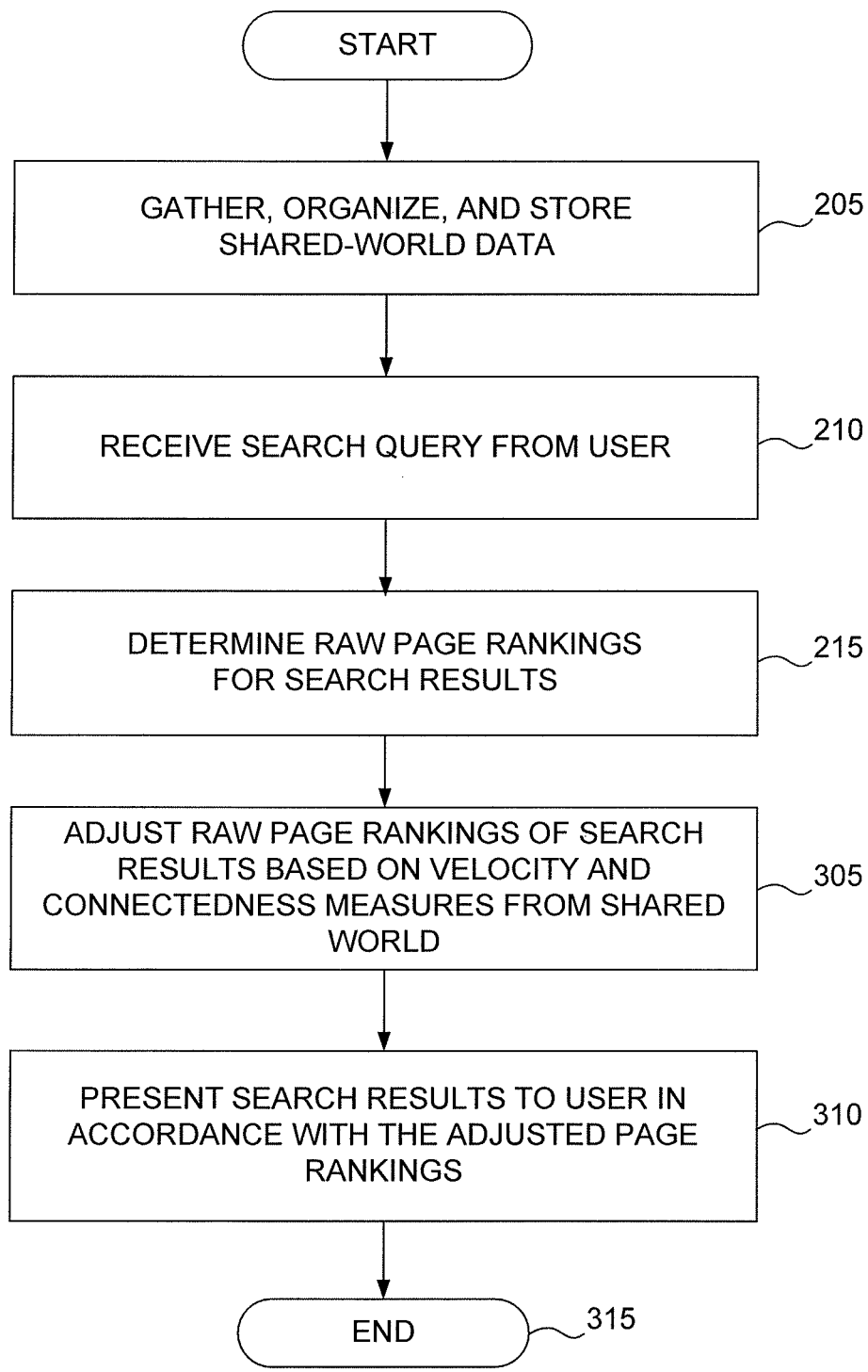
FIG. 3 is a flowchart of a method for ranking Web pages in a Web search engine in accordance with another illustrative embodiment of the invention.

Referring next to FIG. 3, it is a flowchart of a method for ranking Web pages in a Web search engine, in accordance with yet another illustrative embodiment of the invention. This particular embodiment combines the connectedness and velocity measures discussed above. The method shown in FIG. 3 also proceeds as in FIG. 2 through Block 215. At 305, the raw page ranking of each Web page in the search results is adjusted by adding some fraction (e.g., 0.1) of the page's velocity score and some fraction (e.g., 0.01) of the page's connectedness score (based on a count of the number of user traversals or connections from a preceding URL to the target URL) to the raw page ranking.

At 310, search engine 135 presents all or a portion of the search results to the user in accordance with the adjusted page rankings determined at 305. At 315, the process terminates.

In conclusion, the present invention provides, among other things, a method and system for ranking Web pages in a Web search engine. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A computer-server-based method for ranking Web pages in a Web search engine, the method comprising:
receiving, over a network at the computer server, a Web search query from a particular user, the Web search query including at least one keyword, the computer server hosting the Web search engine;
identifying one or more Web pages that contain the at least one keyword;
determining, for each of the one or more Web pages, a raw page ranking;
adjusting the raw page ranking of each of at least one Web page among the one or more Web pages based on direct evidence of how interesting the respective Web page is to users to produce an adjusted page ranking, the direct evidence being derived from clickstream data collected from the users; and
presenting, as search results, the at least one Web page to the particular user in accordance with the adjusted page rankings,
wherein the direct evidence of how interesting a Web page is to users includes a measure of how often the users traverse to or from the Web page in browsing the Web and a measure of how many users have recently visited the Web page compared with how many users normally visit the Web page, and
wherein the measure of how many users have recently visited the Web page compared with how many users normally visit the Web page is given greater weight than the measure of how often the users traverse to or from the Web page in browsing the Web.

2. The computer-server-based method of claim 1, wherein adjusting the raw page ranking of each of at least one Web page among the one or more Web pages based on direct evidence of how interesting the respective Web page is to users to produce an adjusted page ranking includes scaling a number of user traversals to the respective Web page from other Web pages, as indicated by the clickstream data.

3. The computer-server-based method of claim 1, wherein the measure of how often the users traverse to or from a Web page in browsing the Web includes a correlation coefficient that is strengthened by additional user traversals to the Web page from other Web pages and weakened by an absence, over time, of additional user traversals to the Web page from other Web pages.

4. The computer-server-based method of claim 1, wherein the measure of how many users have recently visited a Web page compared with how many users normally visit the Web page is based on how many users visited the Web page during a recent predetermined unit of time compared with how many users, on average, visited the Web page during one or more predetermined units of time preceding the recent predetermined unit of time, as indicated by the clickstream data.

5. The computer-server-based method of claim 1, wherein the raw page ranking of each of the at least one Web page is adjusted in real time in response to the Web search query.

6. The computer-server-based method of claim 1, wherein the raw page ranking of each of the at least one Web page is based, at least in part, on how frequently the at least one keyword occurs in the respective Web page.

7. The method of claim 1, wherein the measure of how many users have recently visited the Web page compared with how many users normally visit the Web page is given greater weight than the measure of how often the users traverse to or from the Web page in browsing the Web by a factor of at least 10.

8. A system for ranking Web pages in a Web search engine, the system comprising:
at least one processor;
a communication interface; and
a memory containing a plurality of program instructions configured to cause the at least one processor to:
receive, via the communication interface over a network, a Web search query from a particular user, the Web search query including at least one keyword;
identify one or more Web pages that contain the at least one keyword;
determine, for each of the one or more Web pages, a raw page ranking;
adjust the raw page ranking of each of at least one Web page among the one or more Web pages based on direct evidence of how interesting the respective Web page is to users to produce an adjusted page ranking, the direct evidence being derived from clickstream data collected from the users; and present, as search results, the at least one Web page to the particular user in accordance with the adjusted page rankings, wherein the direct evidence of how interesting a Web page is to users includes a measure of how often the users traverse to or from the Web page in browsing the Web and a measure of how many users have recently visited the Web page compared with how many users normally visit the Web page, and wherein the measure of how many users have recently visited the Web page compared with how many users normally visit the Web page is given greater weight than the measure of how often the users traverse to or from the Web page in browsing the Web.

9. The system of claim 8, wherein the plurality of program instructions are configured to cause the at least one processor to adjust the raw page ranking of each of at least one Web page among the one or more Web pages based on direct evidence of how interesting the respective Web page is to users to produce an adjusted page ranking by performing calculations that include scaling a number of user traversals to the respective Web page from other Web pages, as indicated by the clickstream data.

10. The system of claim 8, wherein the measure of how often the users traverse to or from a Web page in browsing the Web includes a correlation coefficient that is strengthened by additional user traversals to the Web page from other Web pages and weakened by an absence, over time, of additional user traversals to the Web page from other Web pages.

11. The system of claim 8, wherein the measure of how many users have recently visited a Web page compared with how many users normally visit the Web page is based on how many users visited the Web page during a recent predetermined unit of time compared with how many users, on average, visited the Web page during one or more predetermined units of time preceding the recent predetermined unit of time, as indicated by the clickstream data.

12. The system of claim 8, wherein the plurality of program instructions are configured to cause the at least one processor to adjust the raw page ranking of each of the at least one Web page in real time in response to the Web search query.

13. The system of claim 8, wherein the raw page ranking of each of the at least one Web page is based, at least in part, on how frequently the at least one keyword occurs in the respective Web page.

14. The system of claim 8, wherein the measure of how many users have recently visited the Web page compared with how many users normally visit the Web page is given greater weight than the measure of how often the users traverse to or from the Web page in browsing the Web by a factor of at least 10.

15. A non-transitory computer-readable medium having stored thereon computer-executable instructions that when executed by a computer cause the computer to:

receive, over a network at the computer server, a Web search query from a particular user, the Web search query including at least one keyword, the computer server hosting a Web search engine;

identify one or more Web pages that contain the at least one keyword;

determine, for each of the one or more Web pages, a raw page ranking;

access direct evidence of how interesting the respective Web page is to users, the direct evidence including data derived from clickstream data collected from the users, a measure of how often the users traverse to or from the respective Web page in browsing the Web, and a measure of how many users have recently visited the respective Web page compared with how many users normally visit the respective Web page;

adjust the raw page ranking of each of at least one Web page among the one or more Web pages based on the direct evidence to produce an adjusted page ranking, wherein the measure of how many users have recently visited the respective Web page compared with how many users normally visit the respective Web page is given greater weight than the measure of how often the users traverse to or from the respective Web page in browsing the Web; and present, as search results, the at least one Web page to the particular user in accordance with the adjusted page rankings.

16. The non-transitory computer-readable medium of claim 15, wherein the computer-executable instruction for adjusting the raw page ranking includes scaling a number of user traversals to the respective Web page from other Web pages, as indicated by the clickstream data.

17. The non-transitory computer-readable medium of claim 15, wherein the measure of how often the users traverse to or from a Web page in browsing the Web includes a correlation coefficient that is strengthened by additional user traversals to the Web page from other Web pages and weakened by an absence, over time, of additional user traversals to the Web page from other Web pages.

18. The non-transitory computer-readable medium of claim 15, wherein the measure of how many users have recently visited a Web page compared with how many users normally visit the Web page is based on how many users visited the Web page during a recent predetermined unit of time compared with how many users, on average, visited the Web page during one or more predetermined units of time preceding the recent predetermined unit of time, as indicated by the clickstream data.

19. The non-transitory computer-readable medium of claim 15, wherein the raw page ranking of each of the at least one Web page is adjusted in real time in response to the Web search query.

20. The non-transitory computer-readable medium of claim 15, wherein the raw page ranking of each of the at least one Web page is based, at least in part, on how frequently the at least one keyword occurs in the respective Web page.

* * * * *